March 16, 1943.  N. W. MATTHEWS  2,313,758
ELECTRIC METER
Filed Feb. 11, 1942
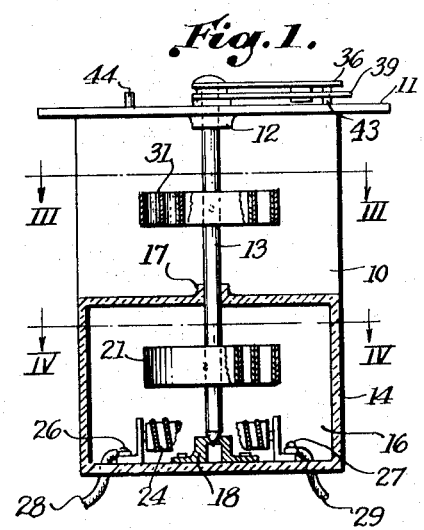
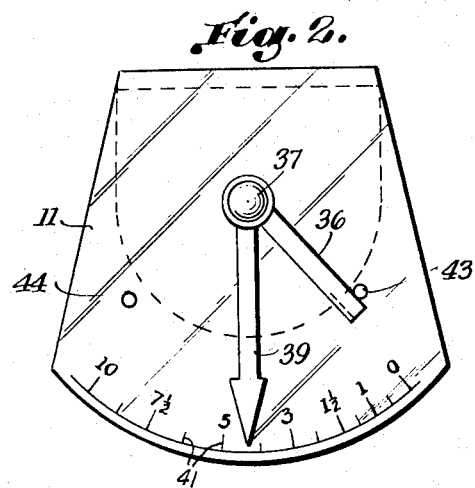
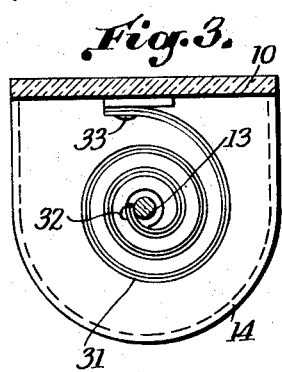
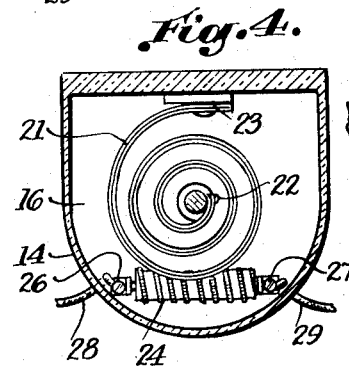
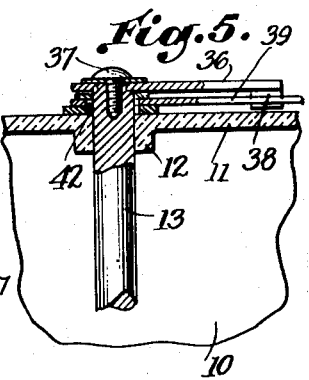
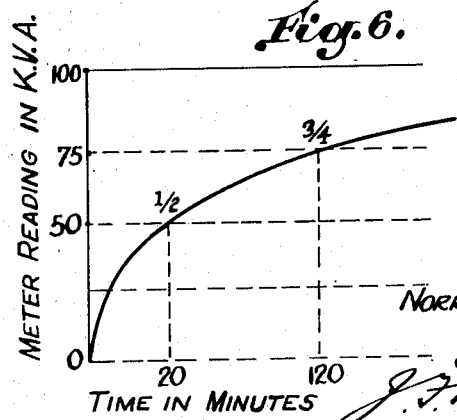
Inventor
NORRIS WHITNEY MATTHEWS.
By J. F. Morkershead
Attorney Patented Mar. 16, 1943

2,313,758

UNITED STATES PATENT OFFICE 2,313,758

ELECTRIC METER

Norris Whitney Matthews, Caldwell, Ohio

Application February 11, 1942, Serial No. 430,405

6 Claims. (Cl. 171—34)

(Granted under the act of March 3, 1883, as amended April 30, 1928; 370 O. G. 757)

This invention relates to the art of determining the continuous rating required for electrical devices and equipment for use in circuits carrying electrical loads of substantially constant or variable magnitude for variable periods of time. The invention provides for determining an adequate and yet not excessive continuous rating for any piece of electrical equipment in which the overload capacity is a function of the time during which the overload exists. Transformers and motors are fairly representative of devices of this general class.

Transformers and motors are guaranteed by their manufacturers to meet the specifications of the American Standards Association which require that such devices be capable of standing certain overloads for prescribed periods of time. For instance, a transformer may be guaranteed to stand 200 per cent of its rating for a period of 20 minutes and to stand possibly 133 per cent of its rating for 120 minutes. The output of an electric motor or of a transformer, for example, depends to a considerable extent upon its ability to release or dissipate the heat generated by the losses therein. In general, any piece of electrical equipment of the class previously referred to herein, may supply far in excess of its continuous rated output for relatively short periods of time provided it has intervening periods of comparatively light or no load during which the accumulation of excess heat stored therein may be dissipated. It will be evident, therefore, that it is highly desirable to be able to select electrical equipment, of the class previously referred to herein, for use in a particular circuit with the assurance that the equipment so selected is capable of meeting the demands to be made upon it without having unneeded overload capacity which unduly increases the cost of the installation by requiring additional capital investment for the unneeded capacity and also incurring additional continuous losses due to the excess installed capacity.

A piece of electrical equipment, such for example as a transformer, may be required for a circuit having different peak loads over a period of 24 hours. The magnitude and the duration of these peak loads as well as of the loads in the intervening periods, during which the transformer may dissipate excess heat, are all factors which enter into the determination of the correct capacity or rating for a transformer for this particular circuit. It usually happens that these characteristics of the loading of a circuit are not accurately known, and in such cases it has been necessary either to determine them, which involves gathering data over a representative period, as over a 24-hour day, or as an alternative, making a guess at the rating required for such equipment.

The purposes of this invention are to provide improved means for determining the proper continuous rating for electrical equipment of the class previously mentioned for use in particular circuits; to provide means connectable in an electric circuit for indicating the continuous rating for a piece of electrical equipment for use in said circuit; to provide a continuous rating meter connectable in an electric circuit and having heat generation and dissipation characteristics so related to the corresponding characteristics of a piece of electrical equipment of the class previously mentioned herein that the proper continuous rating for such piece of electrical equipment may be determined; to provide a continuous rating meter, of the kind just mentioned, having means for indicating the proper continuous rating for a piece of electrical equipment of the class previously referred to herein; and also to provide a continuous rating meter which may be efficient in operation and economical in construction, consisting of few and comparatively simple parts which may be readily manufactured and assembled.

The features of the invention are illustrated in the accompanying drawing, wherein:

Fig. 1 is a front view of a continuous rating meter showing the upper portion thereof in elevation and the lower portion in vertical section with parts broken away to illustrate features of construction;

Fig. 2 is a top plan view of the device shown in Fig. 1;

Figs. 3 and 4 are sections taken, respectively, along the lines III—III and IV—IV of Fig. 1;

Fig. 5 is a fragmentary vertical sectional view illustrating a detail of the indicating means; and Fig. 6 is a graph illustrating the performance of a continuous rating meter of the class described herein.

The invention provides a continuous rating meter having heat generating means bearing the same ratio to the heat dissipating means thereof as the ratio between the heat generating means and the heat dissipating means of each of a number of devices, as transformers for example, having ratings extending over a range including the rating which is adequate but not excessive for such a device for a particular circuit. By making the heat generating means of such a continuous rating meter responsive to the load or burden of the circuit for a representative period, as for a 24-hour day, the proper continuous rating for equipment to be used in the circuit may be ascertained, preferably by indicating means actuated by the instrument.

In the embodiment selected for illustration a continuous rating meter in accordance with this invention is shown as comprising an upright frame member in the form of a panel 10 from which at its upper end a horizontally disposed shelf or table 11 may extend forwardly and be provided with a suitable bearing boss 12 for the upper end of a vertically disposed, rotary spindle 13. A suitable enclosure in the form of a housing 14 may be formed along the lower portion of panel 10 to provide a heat storage chamber 16 from which heat may dissipate through housing 14 to the ambient medium, preferably the atmosphere. The upper wall of this housing may be provided with a suitable radial bearing 17 for the intermediate or central portion of spindle 13, and the lower or bottom wall of the housing may be equipped with a combined radial and thrust bearing 18 of any approved form, but preferably of the self-centering type as shown, as by having a downwardly convergent frusto-conical bearing surface to receive the substantially conical bearing surface formed on the lower end of the spindle.

Any suitable temperature responsive means may be disposed within chamber 16 for actuating spindle 13 in response to change in temperature in this chamber. This temperature responsive means may be in the form of a bi-metallic spiral 21 having its inner end affixed to spindle 13, as by an attaching element 22 (Fig. 4), and having its outer end anchored on housing 14, as upon the rear wall thereof as indicated at 23.

Heat generating means, preferably in the form of a low, non-inductive resistance 24, may also be disposed in suitable heat transfer relation with chamber 16 and the temperature responsive element 21 therein. Preferably this resistance is disposed within chamber 16 as by being mounted on the lower or bottom wall of housing 14 in juxtaposition to temperature responsive element 21. This resistance may also be provided with suitable terminals 26 and 27 by which it may be connected into an electric circuit by leads 28 and 29 extending through suitable openings in housing 14. It will also be understood that if desired, the temperature responsive element may be used as a resistance connectable into a circuit, and in this event resistance 24 could be dispensed with and bi-metallic spiral 21 would then constitute the heat generating means and also the temperature responsive means.

In order to provide a correction for the temperature of the ambient medium, such as air, a suitable temperature responsive element, such as a bi-metallic spiral 31, may be connected at its inner end to spindle 13, as by an attaching element 32 (Fig. 3), and the outer end of this spiral may be anchored to some fixed point, as to panel 10 as indicated at 33. It will be understood that temperature responsive elements 21 and 31 respond to changes in temperature in the same direction, as to a rise in temperature, by tending to turn spindle 13 in opposite directions, and therefore the spirals of these elements are oppositely arranged.

Preferably spindle 13 is provided with means for indicating the maximum angular displacement or rotary movement thereof in response to the combined action of temperature responsive elements 21 and 31. This indicating means may be in the form of a radially disposed arm 36 having its inner end affixed to the spindle as by an attaching screw 37 (Fig. 5), and having preferably at its outer end a depending abutment or lug 38 which is engageable with the shank of an indicating hand 39. This indicating hand may have its outer end in the form of a pointer which is movable over a scale 41 carried by and preferably formed on table 11. The inner end of this indicating hand may be formed to fit loosely over spindle 13, as indicated at 42, so that rotary movement of the spindle does not transmit motion directly to indicating hand 39.

It will be understood that with arm 36 against the limiting abutment or stop 43, as shown (Fig. 2), and indicating hand 39 in position beneath arm 36 to indicate the zero reading on the scale, clockwise movement of spindle 13 will be transmitted through arm 36 and lug 38 to indicating hand 39 so as to cause the latter to move to some position such as that shown in full lines in Fig. 2, but if spindle 13 should then move in a counterclockwise direction, arm 36 and lug 38 would merely move away from indicating hand 39, thus leaving the latter in position to indicate the maximum angular displacement or rotary movement of spindle 13. Preferably a limiting abutment or fixed stop 44 is also provided for engagement with indicating hand 39 to limit maximum clockwise travel thereof.

In order that an instrument as thus far described herein may be adapted for use as a continuous rating meter, it should be so constructed as to bear certain predetermined relationships with devices of the kind to be used in a particular circuit. For instance, it may be desired to install an additional transformer in a circuit, or to determine whether a transformer now in the circuit has the proper rating. It is of course well known that a number of transformers of different ratings have the same overload-time characteristics. For example, all transformers having ratings from 1.5 k. v. a. to 100 k. v. a. will stand the same percentages of overload for the same periods of time. Transformers having ratings in this range have proportional thermal characteristics, that is the ratio between the heat generated and the heat dissipated is the same for these transformers for like percentages of load or overload.

In accordance with this invention an instrument, such as the one shown in the drawing, may be so constructed as to be capable of generating and dissipating heat in the same ratio which is inherent in transformers having ratings in a given range, as in transformers having ratings from 1.5 to 100 k. v. a. To attain these desirable objectives, the heat generating means, such as resistance 24, should be capable of generating heat at a rate which is a function of the electrical load. The heat storage means, comprising chamber 16 formed by the enclosing walls of housing 14, should be capable of dissipating heat through the housing walls at a rate proportional to the rate at which heat dissipates from the device to be rated, as from a transformer having a rating in the range of 1.5 to 100 k. v. a. The heat generating means and the heat dissipating means of the instrument should also be so constructed that the ration between the heat generated in chamber 16 and the heat dissipated therefrom is the same as the ratio between the heat generated and the heat dissipated for the device to be rated, such as the transformer previously mentioned. Preferably the heating resistance, such as resistance 24, is made comparatively low and the heat storage means, such as chamber 16, is made relatively small so as to reduce to a minimum the thermal losses in the instrument.

When an instrument of the class disclosed, such as the one shown in the drawing, is constructed as just described herein, it may be used for determining the proper rating for a device, such as a transformer, for example, for use in a circuit. The divisions and indicia on scale 41 may be entirely arbitrary if desired, but preferably the instrument is so calibrated that the proper rating for the device to be rated may be read directly off this scale. For the purposes of illustration, this scale is shown as consisting of only one set of circumferentially arranged divisions and indicia, but it will be understood that other sets of divisions and indicia may be spaced radially from those shown so that the ratings for devices of different capacities may be read directly from this scale by using the proper set of divisions and indicia.

In using this instrument for determining the proper rating for a transformer, for example, for use in a particular circuit, the resistance 24 may be connected into the circuit preferably at the precise point at which the transformer is to be used. This resistance may be connected directly in series in the circuit by means of leads 28 and 29, but as will be understood by those skilled in this art, it may usually be preferable to connect leads 28 and 29 across one of a series of shunts or current transformers which may be interposed in the circuit and which have been selected for adapting the instrument for indicating directly on scale 41 the proper rating for the device to be rated.

After this continuous rating meter has been connected into the circuit as just described, it may be allowed to remain there for a representative period, such as a 24-hour day or a week or for whatever length of time may be required to include all the variations in loading which occur in the circuit. It will be understood that while this instrument is connected in the circuit, heat generating means 24 will cooperate with heat storage means 16 and heat dissipation means 14 to cause temperature responsive means 21 to impart rotary motion to spindle 13 under the restraining influence of temperature responsive means 31 in continuously correcting this rotary motion for temperature of the ambient medium, such as air. This rotary movement of spindle 13 is transmitted to arm 36, and the latter through lug 38 transmits clockwise movement only to indicating hand 39, causing it to move to and allowing it to remain at its position of maximum displacement from the zero reading. When the attendant returns after the expiration of the representative period, he may read directly off scale 41 the value indicated by hand 39 and thus be informed of the proper continuous rating for the device to be rated.

The graph shown in Fig. 6 further illustrates the mode of operation of continuous rating meters in accordance with this invention. In this graph the ordinates indicate the proper continuous rating for the device to be rated when the actual burden on the instrument is 100 k. v. a., while the abscissa indicate the time in minutes during which the burden on the instrument is 100 k. v. a. It will be seen that if this burden continues for only 20 minutes, indicating hand 39 will point to 50 k. v. a. as the proper rating for a transformer, for example, as a 50 k. v. a. transformer will safely stand 100 per cent overload for a period of 20 minutes. If this burden of 100 k. v. a. should continue for 120 minutes, the instrument will indicate 75 k. v. a. as the proper continuous rating for the transformer, since a transformer may safely stand 133 per cent of its rating for a priod of 120 minutes. It will be evident that other values may be determined from the curve shown in this graph.

The invention described herein, if patented, may be manufactured and used by or for the Government for governmental purposes without the payment to me of any royalty thereon.

It should be understood that the present disclosure is for the purpose of illustration only and that this invention includes all modifications and equivalents which fall within the scope of the appended claims.

I claim as my invention and desire to secure by my patent:

1. A continuous rating meter of the class described, comprising means connectable in an electric circuit for generating heat at a rate which is a function of the electrical load on one of a class of devices to be rated for said circuit, heat storage means for receiving heat from said heat generating means, said heat storage means having heat dissipation characteristics such that heat dissipates therefrom at a rate proportional to the rate at which heat dissipates from the device of the class to be rated for said circuit, the ratio between the heat generated and the heat dissipated being the same for the meter and for the device of the class to be rated for said circuit, an indicator, and means responsive to temperature rise in said heat storage means above ambient temperature for moving said indicator to indicate the continuous rating required for said device.

2. A continuous rating meter of the class described, comprising means connectable in an electric circuit for generating heat at a rate which is a function of the electrical load on one of a class of devices to be rated for said circuit, heat storage means for receiving heat from said heat generating means, said heat storage means having heat dissipation characteristics such that heat dissipates therefrom at a rate proportional to the rate at which heat dissipates from the device of the class to be rated for said circuit, the ratio between the heat generated and the heat dissipated being the same for the meter and for the device of the class to be rated for said circuit, an indicator, a scale indicating the continuous rating required for the device to be rated for said circuit, and means responsive to temperature rise in said heat storage means above ambient temperature for moving said indicator over said scale to indicate the continuous rating required for said device.

3. A continuous rating meter of the class described, comprising means connectable in an electric circuit for generating heat at a rate which is a function of the electrical load on one of a class of devices to be rated for said circuit, heat storage means comprising walls forming a chamber for receiving heat from said heat generating means, said heat storage means having heat dissipation characteristics such that heat dissipates therefrom at a rate proportional to the rate at which heat dissipates from the device of the class to be rated for said circuit, the ratio between the heat generated and the heat dissipated being the same for the meter and for the device of the class to be rated for said circuit, an indicator, and means responsive to temperature rise in said heat storage means above ambient temperature for moving said indicator to indicate the continuous rating required for said device.

4. A continuous rating meter of the class described, comprising heat generating means connectable in an electric circuit for generating heat at a rate which is a function of the electrical load on one of a class of devices to be rated for said circuit, heat storage means comprising walls forming a chamber enclosing said heat generating means for storing heat received from said heat generating means, said heat storage means having heat dissipation characteristics such that heat dissipates therefrom at a rate proportional to the rate at which heat dissipates from the device of the class to be rated for said circuit, the ratio between the heat generated and the heat dissipated being the same for the meter and for the device of the class to be rated for said circuit, an indicator, and means responsive to temperature rise in said heat storage means above ambient temperature for moving said indicator to indicate the continuous rating required for said device.

5. A continuous rating meter of the class described, comprising means connectable in an electric circuit for generating heat at a rate which is a function of the electrical load on one of a class of devices to be rated for said circuit, heat storage means comprising walls forming a chamber for receiving heat from said heat generating means, said heat storage means having heat dissipation characteristics such that heat dissipates therefrom at a rate proportional to the rate at which heat dissipates from the device of the class to be rated for said circuit, the ratio between the heat generated and the heat dissipated being the same for the meter and for the device of the class to be rated for said circuit, an indicator, temperature responsive means within said chamber of said heat storage means for moving said indicator in response to temperature rise in said chamber, and temperature responsive means disposed outside said chamber for restraining said movement of said indicator to correct said movement for ambient temperature so that said indicator may indicate the continuous rating required for said device.

6. A continuous rating meter of the class described, comprising means connectable in an electric circuit for generating heat at a rate which is a function of the electrical load on one of a class of devices to be rated for said circuit, heat storage means for receiving heat from said heat generating means, said heat storage means having heat dissipation characteristics such that heat dissipates therefrom at a rate proportional to the rate at which heat dissipates from the device of the class to be rated for said circuit, the ratio between the heat generated and the heat dissipated being the same for the meter and for the device of the class to be rated for said circuit, an indicator, and oppositely disposed bi-metallic spirals for tending to move said indicator in opposite directions in response to a change in temperature in the same direction, one of said bi-metallic spirals being disposed in heat transfer relation with heat in said heat storage means for moving said indicator in response to temperature rise therein, the other of said bi-metallic spirals being disposed substantially out of heat transfer relation with heat in said heat storage means and in heat transfer relation with the ambient medium for restraining said movement of said indicator to correct said movement for ambient temperature so that said indicator may indicate the continuous rating required for said device.

NORRIS WHITNEY MATTHEWS.